(12) United States Patent
Patel et al.

(10) Patent No.: US 11,745,567 B2
(45) Date of Patent: Sep. 5, 2023

(54) VEHICLE DOOR REINFORCEMENT ASSEMBLY

(71) Applicant: Ford Global Technologies, LLC, Dearborn, MI (US)

(72) Inventors: Deepak Patel, Canton, MI (US); Zhibing Deng, Northville, MI (US); Joseph E. Abramczyk, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 16 days.

(21) Appl. No.: 17/505,680

(22) Filed: Oct. 20, 2021

(65) Prior Publication Data

US 2023/0118760 A1    Apr. 20, 2023

(51) Int. Cl.
*B60J 5/04*    (2006.01)

(52) U.S. Cl.
CPC ............ *B60J 5/0423* (2013.01); *B60J 5/0479* (2013.01)

(58) Field of Classification Search
CPC ........ B60J 5/042; B60J 5/0422; B60J 5/0423; B60J 5/0437; B60J 5/0473; B60J 5/0479; B60J 5/0456; B60R 19/42
USPC ............... 296/146.13, 146.9, 146.6; 293/128
See application file for complete search history.

(56) References Cited

U.S. PATENT DOCUMENTS

| | | | | |
|---|---|---|---|---|
| 5,799,992 A | * | 9/1998 | Kojima | B60J 11/06 293/DIG. 6 |
| 6,694,676 B2 | * | 2/2004 | Sakamoto | B60J 5/0479 292/216 |
| 7,234,765 B1 | | 6/2007 | Mazzei et al. | |
| 7,322,636 B1 | * | 1/2008 | Woodhouse | B60J 5/0477 296/147 |
| 7,448,668 B2 | * | 11/2008 | Brabeck | B60P 3/36 160/180 |
| 9,045,025 B1 | * | 6/2015 | Greene | B60J 5/0473 |
| 10,632,951 B2 | * | 4/2020 | Nusier | B62D 25/20 |
| 10,906,488 B2 | | 2/2021 | Santiago | |
| 2004/0189050 A1 | * | 9/2004 | Kellas | F16F 7/121 296/187.03 |
| 2005/0110236 A1 | | 5/2005 | Stevenson | |
| 2009/0278363 A1 | | 11/2009 | Browne et al. | |
| 2017/0313166 A1 | * | 11/2017 | Sugie | B62D 25/025 |
| 2019/0054957 A1 | | 2/2019 | Faruque et al. | |

FOREIGN PATENT DOCUMENTS

| | | |
|---|---|---|
| GB | 2579381 A | 6/2020 |
| GB | 2579382 A | 6/2020 |
| GB | 2579383 A | 6/2020 |
| JP | 3765274 B2 | 4/2006 |

* cited by examiner

*Primary Examiner* — Joseph D. Pape
*Assistant Examiner* — Veronica M Shull
(74) *Attorney, Agent, or Firm* — Frank A. MacKenzie; Bejin Bieneman PLC (57) ABSTRACT

An assembly includes a vehicle body including a door opening and a first member and a second member each supported by the vehicle body. The first member and the second member are rotatable relative to each other and relative to the vehicle body across the door opening from an undeployed position to deployed position. The first member and the second member engage each other in the deployed position.

19 Claims, 7 Drawing Sheets

VEHICLE DOOR REINFORCEMENT ASSEMBLY

BACKGROUND

A vehicle may include features that increase the ease of occupant ingress and egress. For example, a vehicle may not include a vertical, body-mounted pillar between the front pillar and rear pillar of a door opening. Such vehicles may include two doors that meet at the location traditionally occupied by the vertical, body-mounted pillar when in a closed position. Not having a vertical, body-mounted pillar between the front pillar and the rear pillar of the door opening allows for unobstructed ingress and egress when the doors are in an open position.

DETAILED DESCRIPTION

An assembly includes a vehicle body including a door opening. A first member and a second member are each supported by the vehicle body. The first member and the second member are rotatable relative to each other and relative to the vehicle body across the door opening from an undeployed position to deployed position. The first member and the second member engage each other in the deployed position.

The assembly may include a spring-loaded lock operable to lock the first member and the second member to each other in the deployed position.

The assembly may include a pin abutting the first member and a spring biasing the pin toward the first member in the undeployed position.

The assembly may include a base supported by the vehicle body, the first member and the second member being rotatably connected to the base. The base may include a bottom and walls extending upward from the bottom defining a cavity housing the first member and the second member in the undeployed position. The base may include a ledge and the first member may include a brace disengaged with the ledge in the undeployed position and engaged with the ledge in the deployed position. The first member may include a body rotatably engaged with the base and the brace is vehicle-inboard of the body. The assembly may include pins rotatably connecting the first member and the second member to the base.

The first member and second member in an undeployed position are below the door opening of the vehicle body.

The first member may include a tongue and the second member may include a groove spaced from the tongue in the undeployed position and receiving the tongue in the deployed position.

An assembly includes a base and a first member and a second member each rotatably connected to the base. The first member and the second member are rotatable relative to each other and relative to the base from an undeployed position to deployed position. The first member and the second member engage each other in the deployed position. A pyrotechnic actuator is operatively connected to the first member and/or the second member.

The assembly may include a spring-loaded lock operable to lock the first member and the second member to each other in the deployed position.

The assembly may include a pin abutting the first member and a spring biasing the pin toward the first member in the undeployed position.

The base may include a bottom and walls extending upward from the bottom defining a cavity housing the first member and the second member in the undeployed position. The base may include a ledge and the first member includes a brace disengaged with the ledge in the undeployed position and engaged with the ledge in the deployed position. The first member may include a base rotatably engaged with the base and the brace may be vehicle-inboard of the base.

The assembly may include pins rotatably connecting the first member and the second member to the base.

The first member may include a tongue and the second member may include a groove spaced from the tongue in the undeployed position and receiving the tongue in the deployed position.

The pyrotechnic actuator may be supported by the base.

With reference to the Figures, wherein like numerals indicate like parts throughout the several views, an assembly of a vehicle 10 includes a vehicle body 12 including a door opening 14. A first member 16 and a second member 18 are each supported by the vehicle body 12. The first member 16 and the second member 18 are rotatable relative to each other and relative to the vehicle body 12 across the door opening 14 from an undeployed position to a deployed position. The first member 16 and the second member 18 engage each other in the deployed position.

Since first member 16 and the second member 18 are across the door opening 14 in the deployed position, the first member 16 and the second member 18 reinforce the vehicle body 12 at the door opening 14. Since the first member 16 and the second member 18 engage each other in the deployed position, the first member 16 and the second member 18 reinforce each other to increase the overall structural rigidity of the first member 16 and the second member 18 in the deployed position. As one example, the vehicle 10 shown in the example in the Figures does not include a middle pillar, i.e., is B-pillarless, and, in such an example, the first member 16 and the second member 18 in the deployed position are across the door opening 14 and engage each other to reinforce the area traditionally occupied by a middle pillar.

As set forth further below, a reinforcement assembly 20 includes the first member 16 and the second member 18. For example, the reinforcement assembly 20 may include a base 22 with the first member 16 and the second member 18 rotatably mounted to the base 22. The reinforcement assembly 20, e.g., the base 22, is mounted to the vehicle body 12. The reinforcement assembly 20 may include a pyrotechnic actuator 24 that moves the first member 16 and the second member 18 from the undeployed position to the deployed position.

With reference to the Figures, the vehicle 10 may be any suitable type of automobile, e.g., a passenger or commercial automobile such as a sedan, a coupe, a truck, a sport utility, a crossover, a van, a minivan, a taxi, a bus, etc. The vehicle 10, for example, may be autonomous. In other words, the vehicle 10 may be autonomously operated such that the vehicle 10 may be driven without constant attention from the driver, i.e., the vehicle 10 may be self-driving without human input.

Figure 1:
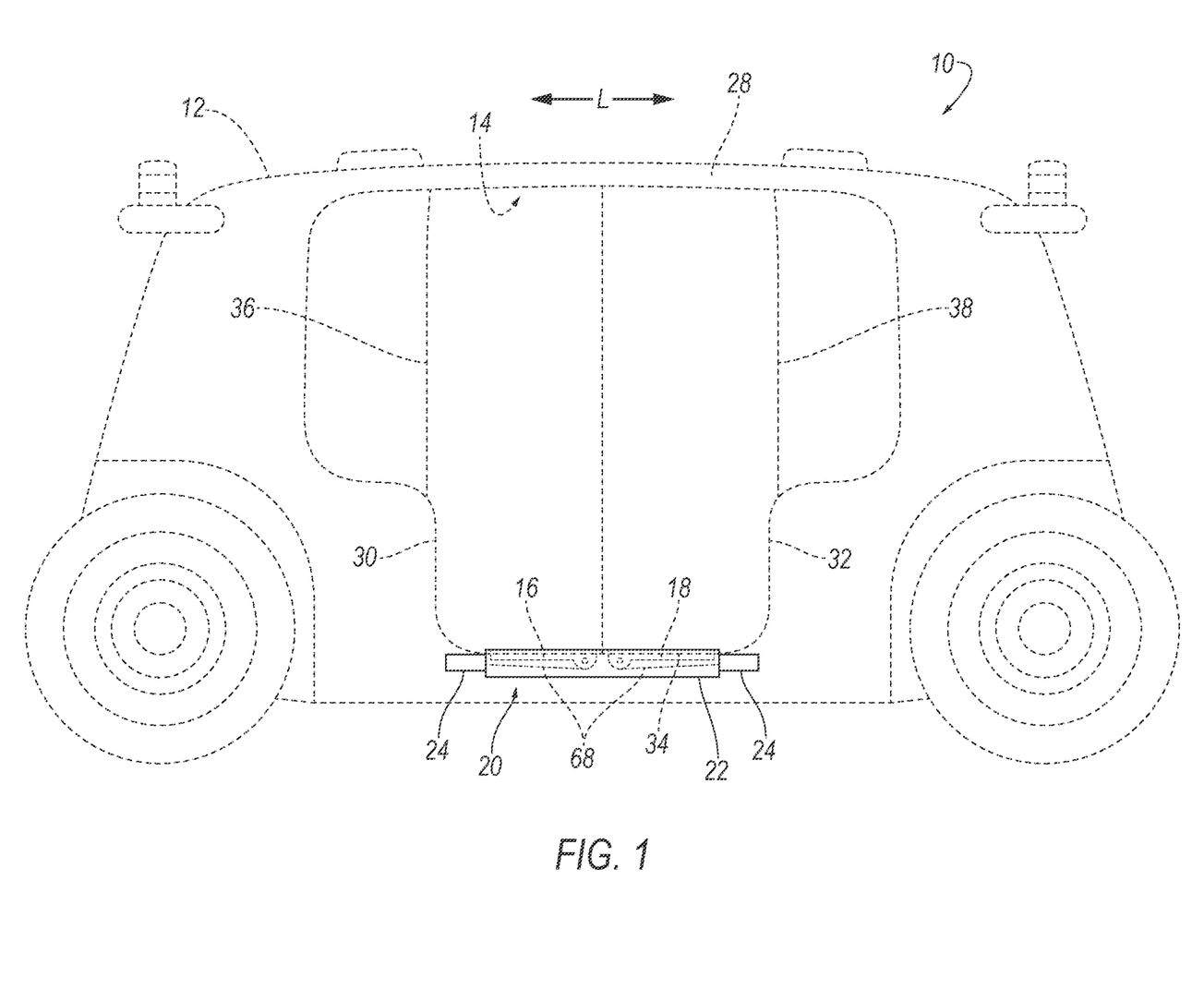
FIG. 1 is a perspective view of the vehicle with a body shown in broken lines to show a reinforcement assembly in an undeployed position.

As shown in FIG. 1, the vehicle 10 includes a vehicle frame (not numbered) and the vehicle body 12. The vehicle frame and the vehicle body 12 may be of a unibody construction in which the vehicle frame is unitary with the vehicle body 12 (including door openings 14, frame rails, pillars 30, roof rails, rockers 34, etc.). As another example, the vehicle body 12 and vehicle frame may have a body-on-frame construction (also referred to as a cab-on-frame construction) in which the vehicle body 12 and vehicle frame are separate components, i.e., are modular, and the vehicle body 12 is supported on and affixed to the vehicle frame. Alternatively, the vehicle frame and vehicle body 12 may have any suitable construction. The vehicle frame and vehicle body 12 (e.g., door openings 14, frame rails, pillars 30, roof rails, rockers 34, etc.) may be of any suitable material, for example, steel, aluminum, and/or fiber-reinforced plastic, etc.

The vehicle body 12 may define a passenger compartment (not numbered) to house occupants, if any, of the vehicle 10. The passenger compartment may extend across the vehicle 10, i.e., from one side to the other side of the vehicle 10. The passenger compartment includes a front end and a rear end with the front end being in front of the rear end during forward movement of the vehicle 10.

Figure 2:
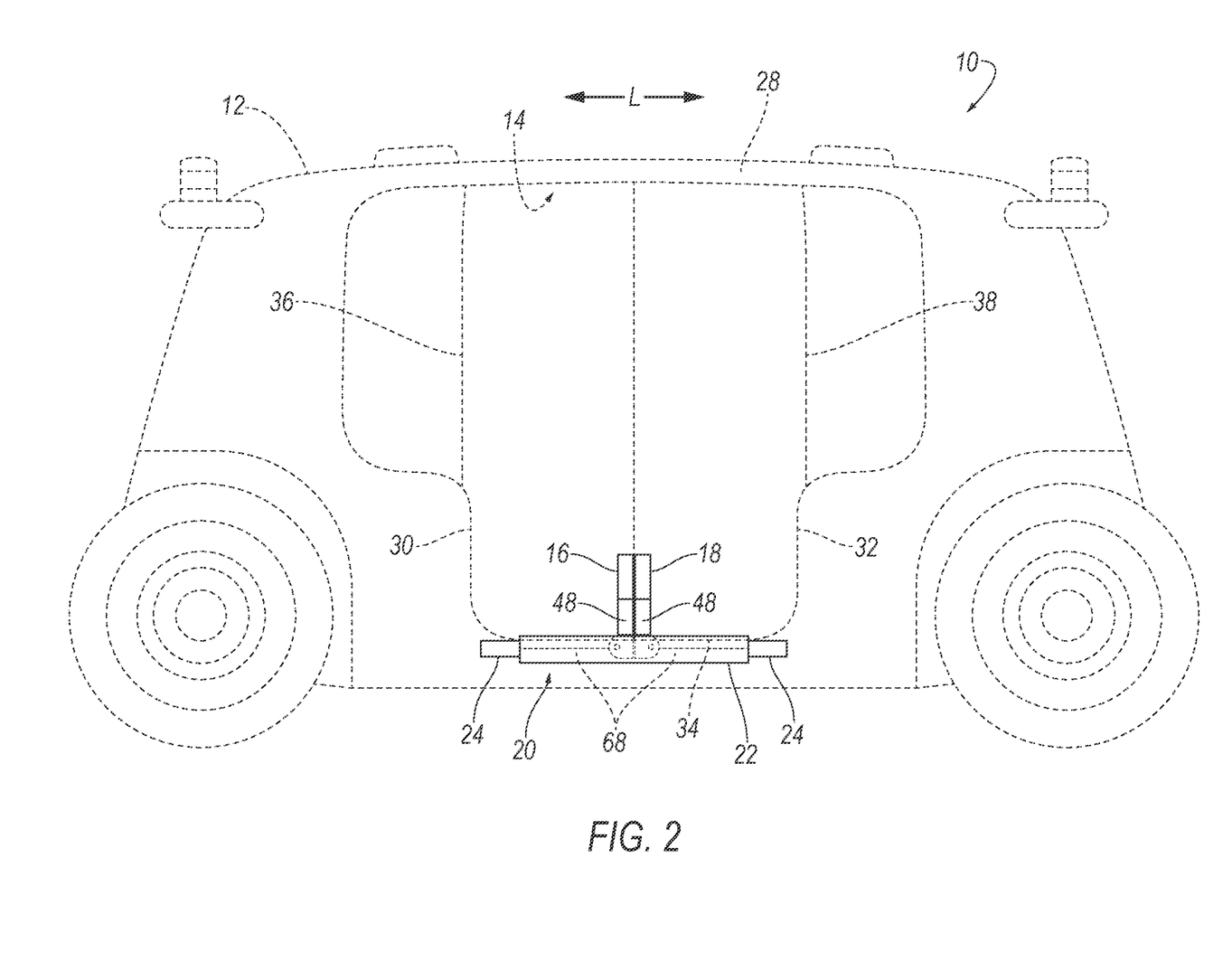
FIG. 2 is a perspective view of the vehicle with the reinforcement assembly in a deployed position.

The vehicle body 12 includes a floor 26 (FIGS. 3A-B) and may include a roof 28 (FIGS. 1-2). The roof 28 may define the upper boundary of the passenger compartment and may extend from the front end of the passenger compartment to the rear end of the passenger compartment. The floor 26 is below from the roof 28. The floor 26 may define the lower boundary of the passenger compartment and may extend from the front end of the passenger compartment to the rear end of the passenger compartment.

With reference to FIGS. 1-2, the vehicle body 12 includes pillars 30, 32 spaced from each along a vehicle-longitudinal axis L. Specifically, the vehicle body 12 includes a first pillar 30 and a second pillar 32. The second pillar 32 may be spaced vehicle-rearward of the first pillar 30, i.e., the first pillar 30 may be referred to as an A-pillar and the second pillar 32 may be referred to as a C-pillar even in examples in which there is no B-pillar. The vehicle body 12 includes pillars 30, 32 on each side of the vehicle 10, i.e., the vehicle body 12 includes one first pillar 30 and one second pillar 32 on each side of the vehicle 10. The first pillar 30 may be disposed at the front end of the passenger compartment and the second pillar 32 may be disposed at the rear end of the passenger compartment. The pillars 30, 32 may extend from the roof 28 to the floor 26. The vehicle 10 may include other pillars in addition to the first pillar 30 and second pillar 32.

With continued reference to FIGS. 1-2, the vehicle body 12 may not include a middle pillar between the first pillar 30 and the second pillar 32, i.e., the vehicle body 12 may not include a middle pillar between the first pillar 30 and the second pillar 32 that extends from the floor 26 to the roof 28. In other words, the vehicle body 12 in FIG. 1 is B-pillarless. The vehicle body 12 lacking a middle pillar allows for the door opening 14 to extend from the first pillar 30 to the second pillar 32. The door opening 14 extending from the first pillar 30 to the second pillar 32 allows easier occupant ingress and egress to the passenger compartment.

The vehicle body 12 may include a rocker 34 extending from the first pillar 30 to the second pillar 32. Specifically, the vehicle body 12 may include two rockers 34, one on each side of the vehicle body 12. The rockers 34 are elongated along the vehicle-longitudinal axis L. The rockers 34 may be adjacent the floor 26. The roof 28, rockers 34, floor 26, and pillars 30 may be irremovably fixed to each other, i.e., unable to be removed without cutting or other destruction of the roof 28 panel and/or roof 28. In some examples, the pillars 30 may be unitary with the rockers 34 and/or the roof 28, i.e., a single, uniform piece of material with no seams, joints, fasteners, or adhesives connecting the pillars 30, to the rockers 34 and/or the roof 28. In such an example, the pillars 30, and rockers 34 and/or roof 28 may be formed together simultaneously as a single continuous unit, e.g., by stamping, molding, etc. In other examples, in the alternative to being unitary, the pillars 30, may be formed separately from the rockers 34 and/or roof 28 and subsequently connected to the rockers 34 and/or roof 28, e.g., by welding.

With reference to FIGS. 1-3B, as set forth above, the vehicle body 12 includes the door opening 14. The door opening 14 may be between the first pillar 30 and the second pillar 32 and between the rocker 34 and the roof 28. Specifically, the door opening 14 may extend from the first pillar 30 to the second pillar 32 and from the rocker 34 to the roof 28. In other words, the pillars 30, 32, are spaced from each other by the door opening 14 and the roof 28 and rocker 34 are spaced from each other by the door opening 14. The door opening 14 extends uninterrupted from the first pillar 30 to the second pillar 32. The door opening 14 extends uninterrupted from the rocker 34 to the roof 28 rails. The door opening 14 allows for ingress into and egress from the passenger compartment. The vehicle 10 may include any suitable number of door openings 14 to allow for occupant ingress and egress. For example, the vehicle 10 may include one door opening 14 on each side of the vehicle 10. In other examples, the vehicle 10 may include multiple door openings 14 on each side of the vehicle 10.

With reference to FIGS. 1-2, the vehicle 10 may include a plurality of doors 36, 38, e.g., one or more doors 36, 38 on any side of the vehicle body 12. As an example, the vehicle 10 may include the first door 36 supported by the first pillar 30 and the second door 38 supported by the second pillar 32. The first door 36 and the second door 38 may be moveably mounted to the vehicle body 12, e.g., the first pillar 30 and the second pillar 32, respectively. For example, the first door 36 and the second door 38 may be slideably mounted (as shown in FIGS. 1-2), hingedly mounted, etc., to the vehicle body 12.

Figure 3A:
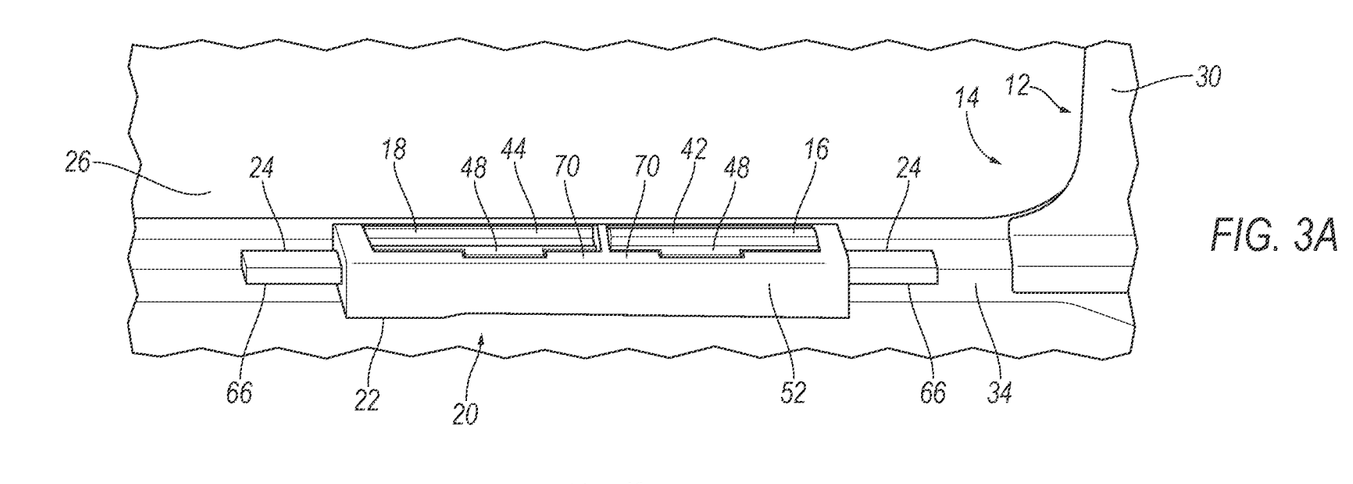
FIG. 3A is a perspective view of a portion of the vehicle including the reinforcement assembly in the undeployed position.
Figure 3B:
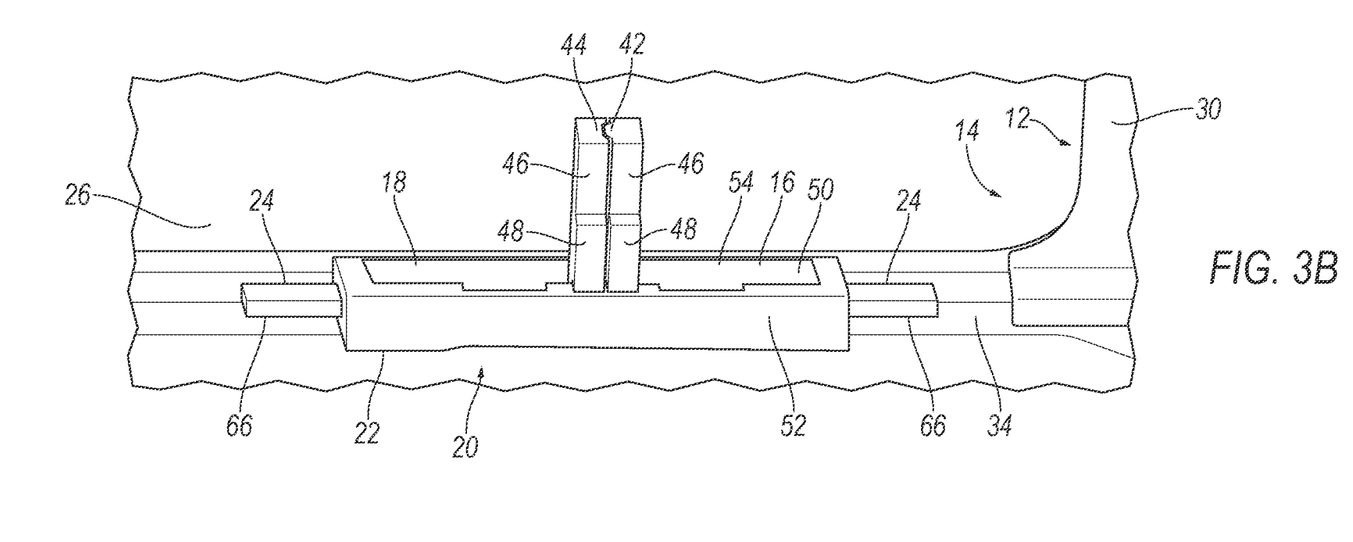
FIG. 3B is a perspective view of a portion of the vehicle including the reinforcement assembly in the deployed position.
Figure 4:
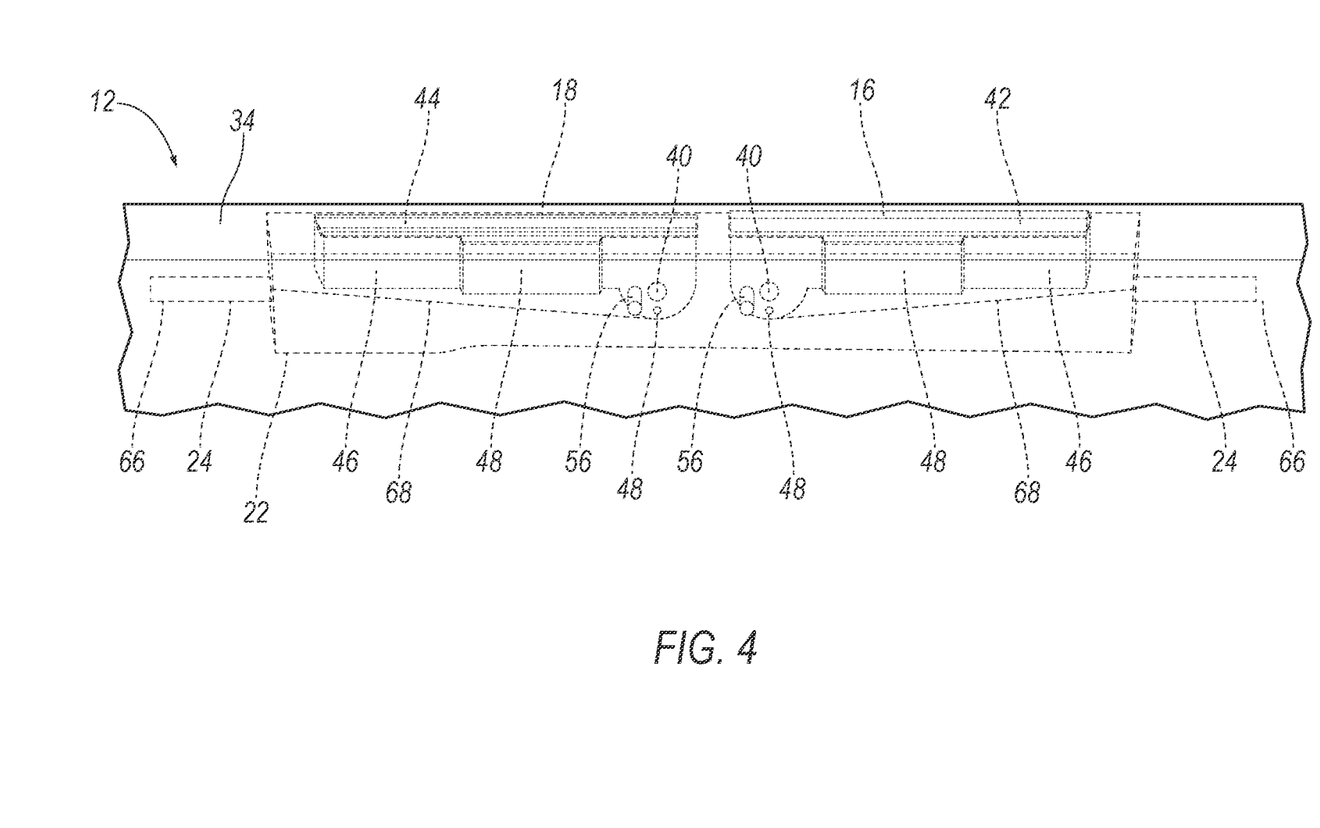
FIG. 4 is a perspective view of a portion of the vehicle including the reinforcement assembly in the undeployed position.
Figure 5:
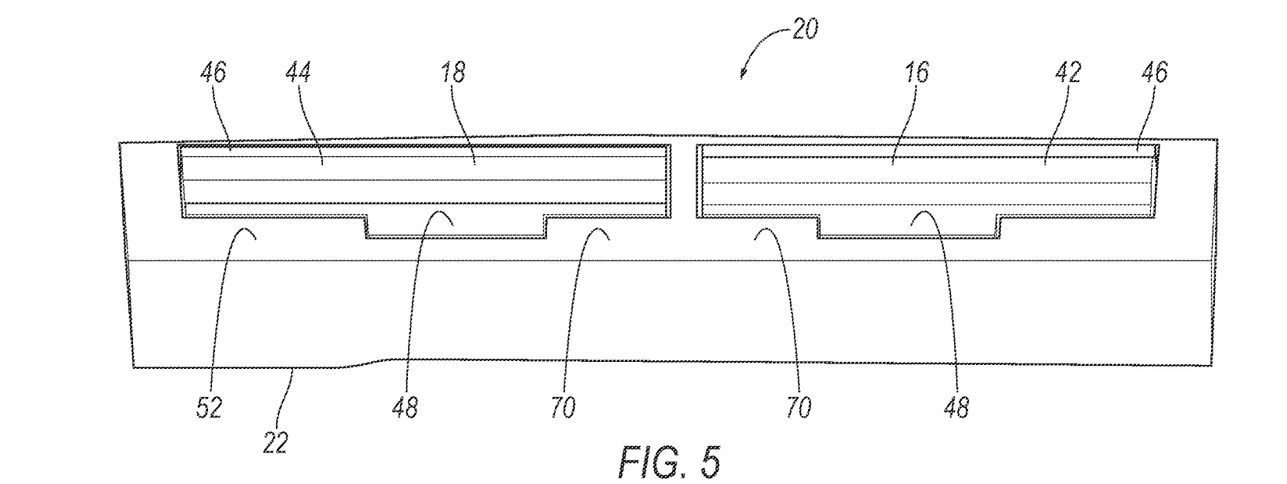
FIG. 5 is a perspective view of the reinforcement assembly in the undeployed position.

As shown in FIGS. 2-3, the first door 36 and the second door 38 are moveable relative to each other between an open positioned (not shown) and a closed position (shown in FIGS. 1-2). In the closed position, the doors 36, 38 are in at least one of the door openings 14 in the vehicle body 12. In the example shown in the Figures, the first door 36 and the second door 38 are both in the single one of door openings 14. The doors 36, 38 may abut each other and may abut the pillars 30, 32, the rocker 34, and the roof 28 in the closed position. In the open position, the door opening 14 is exposed for occupant ingress and egress. When the doors 36, 38 are in the closed position, the reinforcement assembly 20 is inboard of the doors 36, 38, as described further below.

The doors 36, 38 may be slidable between the open position and the closed position. For example, the vehicle body 12 may include a track (not shown with the doors 36, 38 being slidably supported by the track. In such examples, the doors 36, 38 are slidable between the closed position to the open position. In the closed position, the first door 36 and the second door 38 are adjacent each other, e.g., may abut each other. As the doors 36, 38 move to the open position, the first door 36 moves away from the second door 38 and toward the front end of the passenger compartment and the second door 38 moves away from the first door 36 toward the rear end of the passenger compartment. In other examples, the first door 36 and/or the second door 38 may be rotatably mounted, e.g., hinged, to the first pillar 30 and second pillar 32, respectively. In such an example, the doors 36, 38 rotate between the closed position and the open position.

The doors 36, 38 may include at least one door panel (not numbered) and a door-trim panel (not numbered) supported on the door panel. Specifically, the doors 36, 38 may include two panels, namely a door inner and a door outer. In such an example, the door-trim panel and the door outer are fixed to the door inner. The door-trim panel is positioned opposite the door outer relative to the door 36 frame. The door-trim panel is inboard relative to the door inner and the door outer is outboard relative to the door inner. The door outer faces outboard relative to the vehicle 10. The door outer may define a portion of the exterior of the vehicle 10. For example, the door outer may present a class-A surface, i.e., a surface specifically manufactured to have a high-quality, finished aesthetic appearance free of blemishes. The door outer may be metal (such as steel, aluminum, etc.) or polymeric (such as fiber reinforced plastic composite, etc.).

Figure 6:
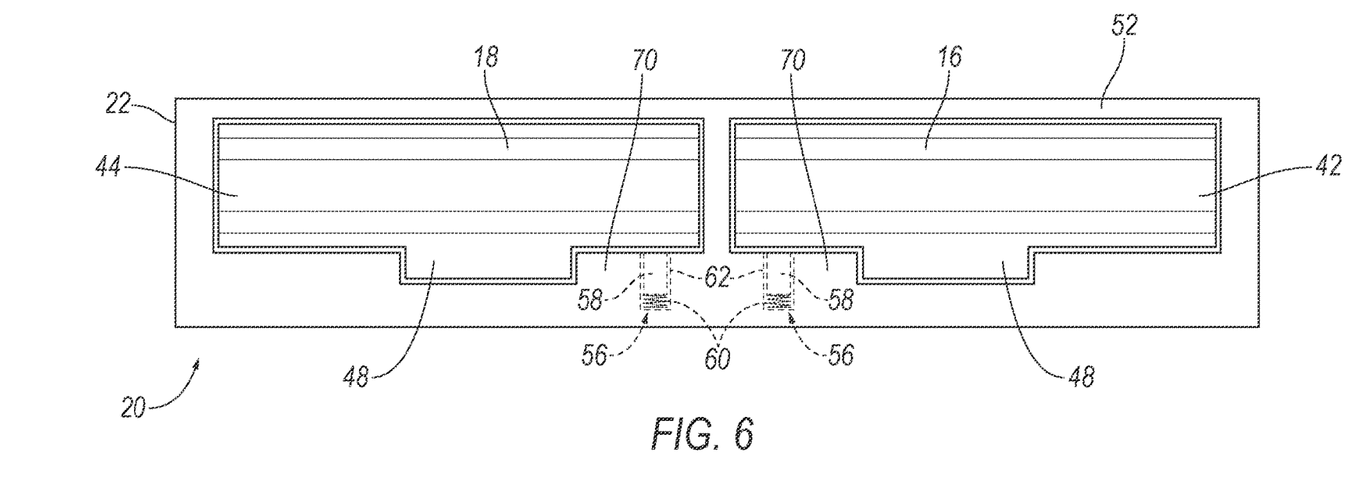
FIG. 6 is a top view of the reinforcement assembly with a spring-loaded lock shown in broken lines.
Figure 7:
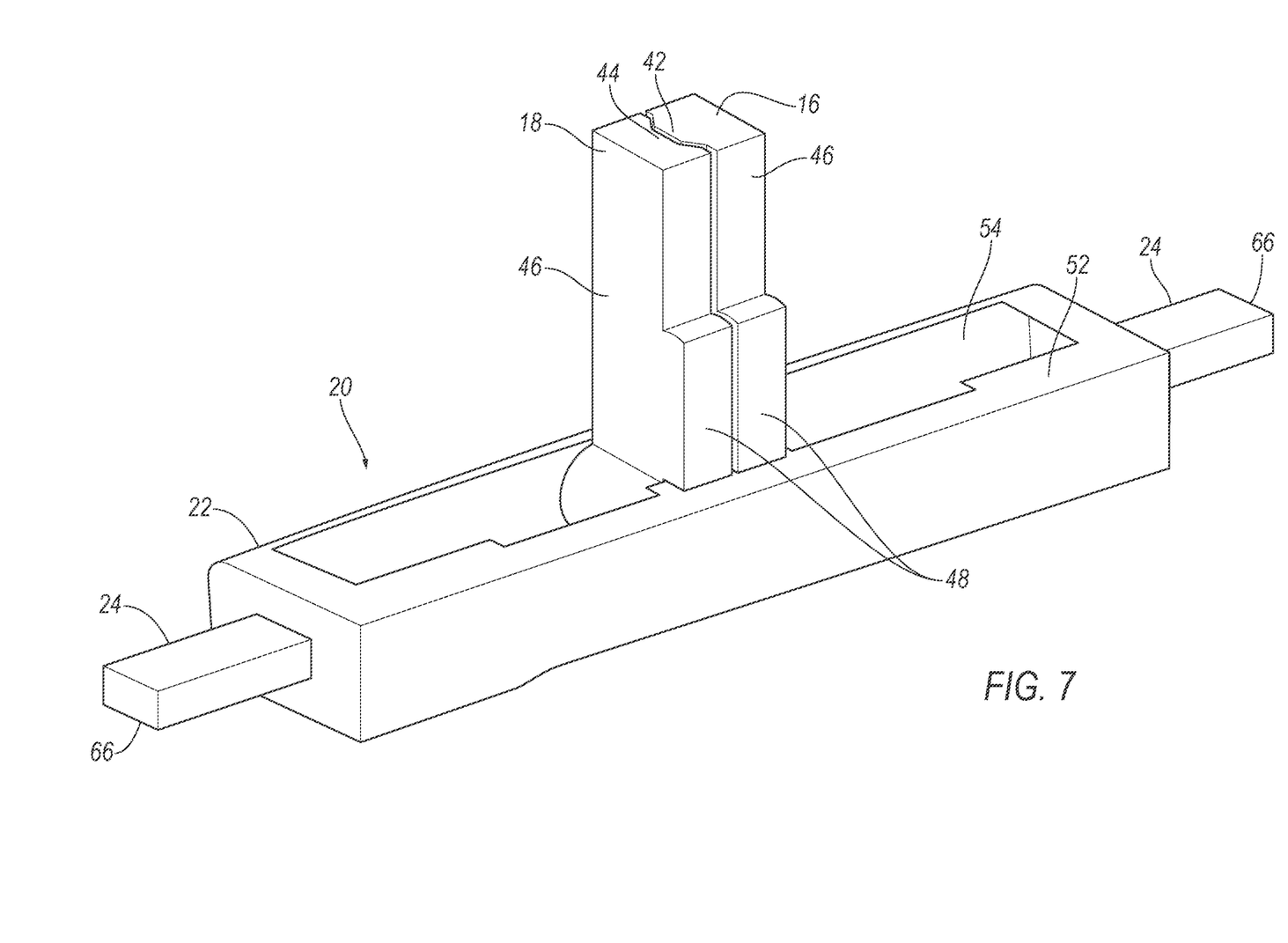
FIG. 7 is a perspective view of the reinforcement assembly in the deployed position with a first member and second member of the reinforcement assembly rotated relative to a base of the reinforcement assembly.
Figure 8:
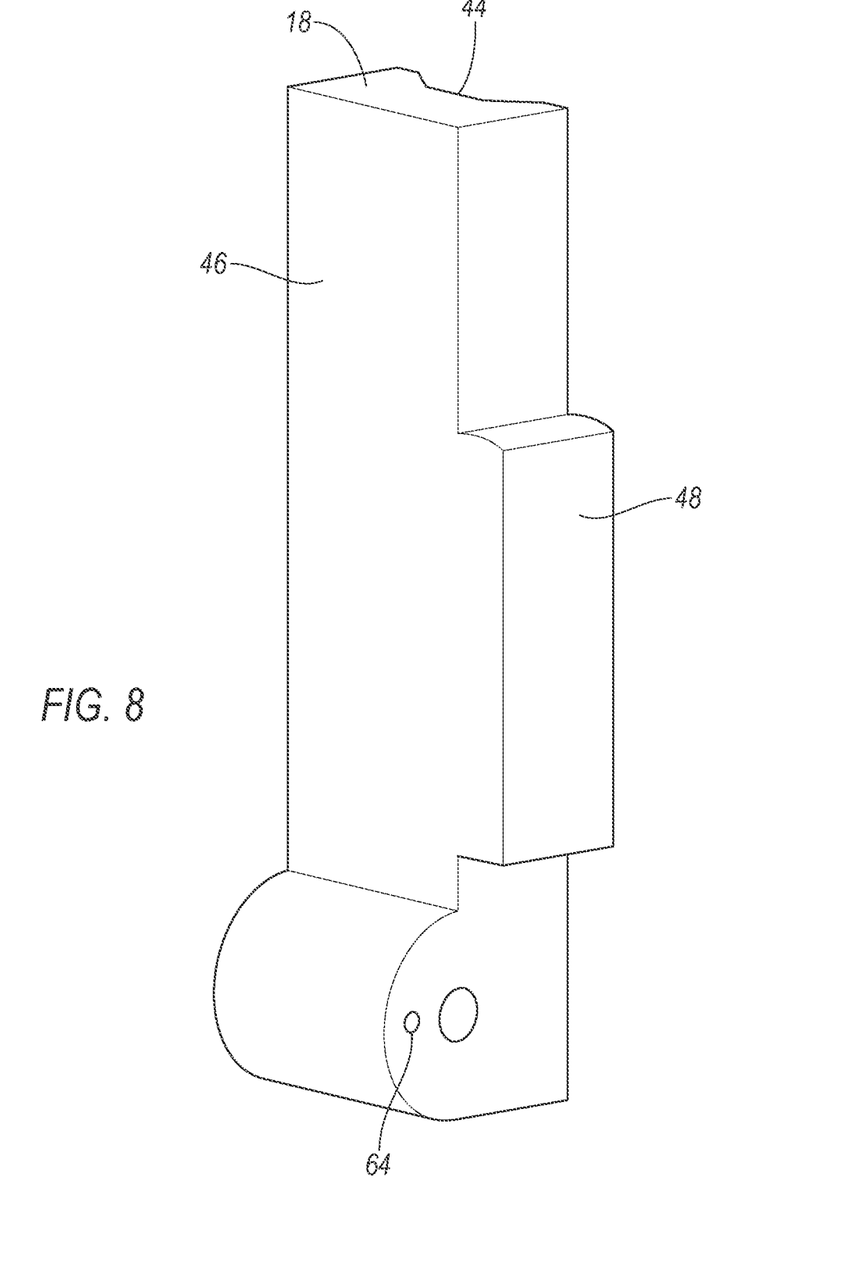
FIG. 8 is a perspective view of one of the members of the reinforcement assembly.

As set forth above, the reinforcement assembly 20 includes the first member 16 and the second member 18 and may include the base 22 and the pyrotechnic actuator 24. In an example including the base 22, the base 22 may be fixed to the vehicle body 12 and the first member 16 and second member 18 are rotatably connected to the base 22. The reinforcement assembly 20 is moveable from the undeployed position (FIGS. 1, 3A, and 4-6) to the deployed position (FIGS. 2, 3B, and 7). Specifically, the first member 16 and the second member 18 rotate from the undeployed position to the deployed position.

As set forth above, the first member 16 and the second member 18 are each supported by the vehicle body 12. Specifically, the weight of the first member 16 and the second member 18 are borne directly or indirectly by the vehicle body 12. For example, in the example shown in the Figures, the reinforcement assembly 20 may include a base 22 and in such an example, the base 22 is supported by the vehicle body 12 and the first member 16 and second member 18 are supported by the vehicle body 12. In such an example, the base 22 may be directly connected to the vehicle body 12 and the first member 16 and second member 18 may be directly connected to the base 22, as described below.

As set forth above, the first member 16 and the second member 18 may be directly connected to the base 22. For example, pins 40 may rotatably connect the first member 16 and the second member 18 to the base 22 (e.g., a first pin 40 connects the first member 16 to the base 22 and a second pin 40 connects the second member 18 to the base 22). Specifically, for example, as set forth above, first member 16 and the second member 18 may each define a hole (not numbered) and the pins 40 extend through the holes, respectively, and engage the base 22. In such an example, the first member 16 and the second member 18 are rotatably connected to the base 22.

As set forth above, the first member 16 and the second member 18 are rotatable from the undeployed position to the deployed position. Specifically, the first member 16 and the second member 18 are both rotatable relative to each other and relative to the vehicle body 12 from the undeployed position to the deployed position. In the undeployed position, the first member 16 and the second member 18 are lowered, e.g., entirely or partly recessed relative to the vehicle body 12, door opening 14, etc. Specifically, in the undeployed position, the first member 16 and the second member 18 are positioned to avoid interference with occupant ingress and egress to the passenger compartment. In the undeployed position, the first member 16 and the second member 18 are below, i.e., vertically lower than, the door opening 14 and/or the doors 36, 38 in the door opening 14. In the example shown in the Figures, the first member 16 and the second member 18 are inboard of the doors 36, 38 and the door opening 14 in the undeployed position.

As set forth above, the first member 16 and the second member 18 are across the door opening 14 in the deployed position. In other words, the first member 16 and the second member 18 extend from the vehicle body 12 into or adjacent to the door opening 14 in the deployed position. Specifically, the rocker 34 includes an uppermost surface and at least a portion of the first member 16 and the second member 18 are vertically above the uppermost surface either in the door opening 14 or adjacent the door opening 14 in the deployed position. In the example shown in the Figures, the first member 16 and the second member 18 are inboard of the door opening 14 adjacent the door opening 14, i.e., with nothing between the first member 16 and second member 18 and the doors 36, 38 and door opening 14. The first member 16 and the second member 18 are upright in the deployed position. As an example, the first member 16 and the second member 18 may be vertical in the deployed position.

As set forth above, the first member 16 and the second member 18 may be inboard of the doors 36, 38 in the deployed position. In other words, with the doors 36, 38 in the closed position, the first member 16 and the second member 18 may be inboard of the innermost surface of the door 36 adjacent the first member 16 and the second member 18, e.g., the surface of the door-trim panel. As set forth below, the first member 16 and the second member 18 may be rotated to the deployed position in response to a detected vehicle impact.

The first member 16 and second member 18 are between the first pillar 30 and the second pillar 32 along the vehicle-longitudinal axis L of the vehicle 10 in the undeployed position and the deployed position. As an example, the first member 16 and the second member 18 may be at the joint of the first door 36 and the second door 38 when the first door 36 and the second door 38 are in the closed position and the first member 16 and second member 18 are in the deployed position. In such an example, the first member 16 and the second member 18 in the deployed position may be in a middle third of the door opening 14 along the vehicle-longitudinal axis L of the vehicle 10.

In the deployed position, the first member 16 and the second member 18 are elongated upwardly across the door opening 14, e.g., elongated from the rocker 34 upwardly across the door opening 14. As an example, the first member 16 and the second member 18 may be elongated substantially vertically. The first member 16 and the second member 18 may extend upwardly, e.g., from the rocker 34, 8-24 inches.

The first member 16 and the second member 18 may be of a rigid type of material and construction. As described further below, the first member 16 and the second member 18 may include a tongue 42 and groove 44, respectively. The first member 16 and the second member 18 may be rectangular in cross section, as shown in the example in the Figures. The first member 16 and the second member 18 may be, for example, metal (such as steel, aluminum, etc.), plastic (such as fiber-reinforced plastic), etc.

As set forth above, in the deployed position, the first member 16 and the second member 18 engage each other. For example, the first member 16 and the second member 18 interlock with each other. Specifically, one of the first member 16 and the second member 18 includes a tongue 42 and the other of the first member 16 and second member 18 includes a groove 44. In the undeployed position, the tongue 42 is disengaged with the groove 44 and in the engaged position the tongue 42 is engaged in the groove 44. In such an example, the tongue 42 and the groove 44 are designed, i.e., sized, shaped, and positioned, to engage each other when the first member 16 and the second member 18 are in the deployed position. Specifically, the first member 16 and second member 18 each include a body 46 and the tongue 42 extends from the body 46 along vehicle-longitudinal axis L of the vehicle 10 and the groove 44 extends into the body 46 along the vehicle-longitudinal axis L of the vehicle 10. Accordingly, the tongue 42 and the groove 44 engage each other along the vehicle-longitudinal axis L in the deployed position. In the example shown in the Figures, merely by way of example, the first member 16 includes the tongue 42 and the second member 18 includes the groove 44. Since the first member 16 and the second member 18 engage each other in the deployed position, the first member 16 and the second member 18 reinforce each other to increase the overall structural rigidity of the first member 16 and the second member 18 in the deployed position. Specifically, the first member 16 and the second member 18 engage each other, e.g., the tongue 42 and groove 44 engage each other, in a plane transverse to a vehicle-side impact.

The first member 16 and/or the second member 18 may include a brace 48. Specifically, the brace 48 extends from the body 46 vehicle-inboard. When the first member 16 and the second member 18 are deployed, the brace 48 is inboard of the body 46. During a vehicle-side impact, forces from the vehicle-side impact may push the body 46 toward the brace 48. During a vehicle-side impact, the brace 48 abuts another component of the vehicle 10. For example, as shown in the Figures, the brace 48 abuts the base 22. Specifically, in the example shown in the Figures, the base 22 includes a ledge 70 and the brace 48 abuts the ledge 70 in the deployed position. In such an example, the brace 48 is spaced from the ledge 70 in the undeployed position and abuts the ledge 70 in the deployed position. In the example shown in the Figures, both the first member 16 and the second member 18 include the brace 48.

As set forth above, the reinforcement assembly 20 may include a base 22 that houses the first member 16 and the second member 18. The base 22 may be supported by the vehicle body 12 and the first member 16 and second member 18 may be supported by the base 22, i.e., the weight of the base 22 may be borne by the vehicle body 12 and the weight of the first member 16 and second member 18 may be borne by the base 22. The base 22 may be, for example, fixed to the vehicle body 12, e.g., with fasteners, welding, etc.

The base 22 includes a bottom 50 and walls 52 extending upward from the bottom 50 defining one or more cavities 54 housing the first member 16 and the second member 18 in the undeployed position. The walls 52 are configured to, i.e., sized, shaped, and positioned, to house the first member 16 and the second member 18 in the undeployed position. The first member 16 and the second member 18 may be completely recessed relative to the walls 52 in the undeployed position, as shown in the example show in the Figures. As set forth above, the base 22 may be directly connected to the vehicle body 12. For example, the bottom 50 and/or walls 52 of the base 22 may abut the vehicle body 12 and may be welded, fastened, etc., to the vehicle body 12.

The reinforcement assembly 20 may include a spring-loaded lock 56 operable to lock the first member 16 and the second member 18 to each other in the deployed position. Specifically, the spring-loaded lock 56 may be between the base 22 and the first member 16 and/or second member 18 to lock the first member 16 and/or second member 18 relative to the base 22 to lock the first and/or second member 16, 18 relative to the base 22 in the deployed position. In the example shown in the Figures, the reinforcement assembly 20 includes one of the spring-loaded locks 56 between the base 22 and the first member 16 and another of the spring-loaded locks 56 between the base 22 and the second member 18. The spring-loaded locks 56 lock the first member 16 and the second member 18, respectively, relative to the base 22 and relative to each other.

The spring-loaded lock 56 may include a pin 58 abutting the first/second member 16, 18 and a spring 60 biasing the pin 58 toward the first/second member 16, 18 in the undeployed position. Specifically, the spring-loaded lock 56 may be housed by the base 22. With reference to FIG. 6, in the example shown in the Figures, the base 22 includes a pocket 62 housing the pin 58 and the spring 60. The first/second member 16, 18 includes a hole 64 that is aligned with and receive the pin 58 when the first/second member 16, 18 is in the deployed position and the spring 60 pushes the pin 58 into the hole 64. With the pin 58 in the hole 64, the first/second member 16, 18 is locked relative to the base 22 to remain in the deployed position.

The pyrotechnic actuator 24 operatively connected to the first member 16 and/or the second member 18. Specifically, the pyrotechnic actuator 24 moves the first/second member 16, 18 to the deployed position. In the example shown in the Figures, the pyrotechnic actuator 24 include a cylinder 66 and a cable 68 engaged with the cylinder 66 and connected to the first/second member 16, 18 at a connection point spaced from the pin 40. The pyrotechnic actuator 24 is actuated to retract the cable 68 into the cylinder 66 and pull the first/second member 16, 18 to rotate the body 46 of the first/second member 16, 18 about the pin 40 from the undeployed position to the deployed position.

The pyrotechnic actuator 24 may be fixed to and supported by the base 22 or the vehicle body 12. The pyrotechnic actuator 24 includes a pyrotechnic charge. The pyrotechnic charge is activated to activate the pyrotechnic actuator 24 and retract the cable into the cylinder. The pyrotechnic actuator 24 may be, for example, a rotary actuator or a linear actuator. The pyrotechnic actuator 24 may be a component of the reinforcement assembly 20. In such an example the pyrotechnic actuator 24 may be fixed to and/or supported by the base 22.

The vehicle 10 includes a computer that controls the pyrotechnic actuator 24. The computer may be, for example, a restraints control module. The vehicle 10 computer includes a processor and a memory. The memory includes one or more forms of computer readable media, and stores instructions executable by the vehicle 10 computer for performing various operations, including as disclosed herein. For example, a vehicle 10 computer can be a generic computer with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, a vehicle 10 computer may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer. The memory can be of any type, e.g., hard disk drives, solid state drives, servers, or any volatile or non-volatile media. The memory can store the collected data sent from the sensors. The memory can be a separate device from the computer, and the computer can retrieve information stored by the memory via a network in the vehicle 10, e.g., over a CAN bus, a wireless network, etc. Alternatively or additionally, the memory can be part of the computer, e.g., as a memory of the computer. The computer may include programming to operate one or more of vehicle 10 brakes, propulsion e.g., control of acceleration in the vehicle 10 by controlling one or more of an internal combustion engine, electric motor, hybrid engine, etc., steering, climate control, interior and/or exterior lights, etc., as well as to determine whether and when the computer, as opposed to a human operator, is to control such operations. Additionally, the computer may be programmed to determine whether and when a human operator is to control such operations. The computer may include or be communicatively coupled to, e.g., via a vehicle 10 network such as a communications bus as described further below, more than one processor, e.g., included in components such as sensors, electronic control units (ECUs) or the like included in the vehicle 10. The computer is generally arranged for communications on a vehicle communication network that can include a bus in the vehicle 10 such as a controller area network CAN or the like, and/or other wired and/or wireless mechanisms. Alternatively or additionally, in cases where the computer actually comprises a plurality of devices, the vehicle communication network may be used for communications between devices represented as the computer in this disclosure. Further, as mentioned below, various controllers and/or sensors may provide data to the computer via the vehicle communication network.

The vehicle 10 may include at least one impact sensor for sensing impact of the vehicle 10. The impact sensor is in communication with the computer. The computer may activate the pyrotechnic actuator 24, e.g., provide an impulse to a pyrotechnic charge of the pyrotechnic actuator 24 when the impact sensor senses an impact of the vehicle 10. Alternatively or additionally to sensing impact, the impact sensor may be configured to sense impact prior to impact, i.e., pre-impact sensing. The impact sensor is configured to detect an impact to the vehicle 10. The impact sensor may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor may be located at numerous points in or on the vehicle 10.

The vehicle 10 includes a communication network that can include a bus in the vehicle 10 such as a controller area network (CAN) or the like, and/or other wired and/or wireless mechanisms. Via the vehicle 10 network, the computer may transmit messages to various devices in the vehicle 10 and/or receive messages (e.g., CAN messages) from the various devices, e.g., sensors, an actuator, an human machine interface (HMI), etc. Alternatively or additionally, in cases where the computer actually comprises a plurality of devices, the vehicle communication network may be used for communications between devices represented as the computer in this disclosure. Further, as mentioned below, various controllers and/or sensors may provide data to the computer via the vehicle communication network.

The disclosure has been described in an illustrative manner, and it is to be understood that the terminology which has been used is intended to be in the nature of words of description rather than of limitation. Numerical adjectives "first," "second," etc., are used herein merely as identifiers and do not indicate order or importance. Many modifications and variations of the present disclosure are possible in light of the above teachings, and the disclosure may be practiced otherwise than as specifically described.

What is claimed is:

1. An assembly comprising:
   a vehicle body including a door opening extending along a longitudinal axis; and
   a first member and a second member each supported by the vehicle body;
   the first member and the second member being rotatable relative to each other and relative to the vehicle body across the door opening from an undeployed position to a deployed position;
   the first member and the second member being elongated along the longitudinal axis in the undeployed position and elongated upwardly across the door opening in the deployed position;
   the first member and the second member being spaced from each other along the longitudinal axis in the undeployed position; and
   the first member and the second member engaging each other in the deployed position.

2. The assembly as set forth in claim 1, further comprising a spring-loaded lock operable to lock the first member and the second member to each other in the deployed position.

3. The assembly as set forth in claim 1, further comprising a pin abutting the first member and a spring biasing the pin toward the first member in the undeployed position.

4. The assembly as set forth in claim 1, further comprising a base supported by the vehicle body, the first member and the second member being rotatably connected to the base.

5. The assembly as set forth in claim 4, wherein the base includes a bottom and walls extending upward from the bottom defining a cavity housing the first member and the second member in the undeployed position.

6. The assembly as set forth in claim 4, wherein the base includes a ledge and the first member includes a brace disengaged with the ledge in the undeployed position and engaged with the ledge in the deployed position.

7. The assembly as set forth in claim 6, wherein the first member includes a body rotatably engaged with the base and the brace is vehicle-inboard of the body.

8. The assembly as set forth in claim 4, further comprising pins rotatably connecting the first member and the second member to the base.

9. The assembly as set forth in claim 1, wherein the first member and second member in an undeployed position are below the door opening of the vehicle body.

10. The assembly as set forth in claim 1, wherein the first member includes a tongue and the second member includes a groove spaced from the tongue in the undeployed position and receiving the tongue in the deployed position.

11. An assembly comprising:
a base;
a first member and a second member each rotatably connected to the base;
the first member and the second member being rotatable relative to each other and relative to the base from an undeployed position to a deployed position;
the first member and the second member engaging each other in the deployed position;
a pyrotechnic actuator operatively connected to the first member and/or the second member; and
pins rotatably connecting the first member and the second member to the base.

12. The assembly as set forth in claim 11, further comprising a spring-loaded lock operable to lock the first member and the second member to each other in the deployed position.

13. The assembly as set forth in claim 11, further comprising a second pin abutting the first member and a spring biasing the second pin toward the first member in the undeployed position.

14. The assembly as set forth in claim 11, wherein the base includes a bottom and walls extending upward from the bottom defining a cavity housing the first member and the second member in the undeployed position.

15. The assembly as set forth in claim 14, wherein the base includes a ledge and the first member includes a brace disengaged with the ledge in the undeployed position and engaged with the ledge in the deployed position.

16. The assembly as set forth in claim 15, wherein the first member includes a base rotatably engaged with the base and the brace is vehicle-inboard of the base.

17. The assembly as set forth in claim 11, wherein the first member includes a tongue and the second member includes a groove spaced from the tongue in the undeployed position and receiving the tongue in the deployed position.

18. The assembly as set forth in claim 11, wherein the pyrotechnic actuator is supported by the base.

19. An assembly comprising:
a vehicle body including a door opening; and
a first member and a second member each supported by the vehicle body;
the first member and the second member being rotatable relative to each other and relative to the vehicle body across the door opening from an undeployed position to deployed position; and
the first member and the second member engaging each other in the deployed position;
a base supported by the vehicle body, the first member and the second member being rotatably connected to the base;
the base including a ledge and the first member including a brace disengaged with the ledge in the undeployed position and engaged with the ledge in the deployed position; and
the first member including a body rotatably engaged with the base and the brace extends from the body.

* * * * *